(12) United States Patent
Mukai et al.

(10) Patent No.: US 7,209,443 B2
(45) Date of Patent: Apr. 24, 2007

(54) BANDWIDTH UPDATING METHOD AND BANDWIDTH UPDATING APPARATUS

(75) Inventors: Hiroaki Mukai, Tokyo (JP); Toshikazu Yoshida, Tokyo (JP); Tetsuya Yokotani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1045 days.

(21) Appl. No.: 10/073,923

(22) Filed: Feb. 14, 2002

(65) Prior Publication Data

US 2003/0043741 A1    Mar. 6, 2003

(30) Foreign Application Priority Data

Aug. 31, 2001    (JP) .............................. 2001-263223

(51) Int. Cl.
*G01R 31/08*    (2006.01)

(52) U.S. Cl. ...................... 370/235; 370/230; 370/437; 370/468

(58) Field of Classification Search ..................... None
See application file for complete search history.

(56) References Cited

U.S. PATENT DOCUMENTS

| | | | |
|---|---|---|---|
| 5,673,253 A | | 9/1997 | Shaffer |
| 5,799,002 A | | 8/1998 | Krishnan |
| 6,266,330 B1 | | 7/2001 | Jokinen et al. |
| 6,434,164 B1 | * | 8/2002 | Matsunaga et al. ......... 370/443 |
| 6,775,701 B1 | * | 8/2004 | Pan et al. .................... 709/226 |
| 6,804,256 B2 | * | 10/2004 | Chang ......................... 370/468 |
| 6,980,519 B1 | * | 12/2005 | Horn et al. .................. 370/235 |

(Continued)

FOREIGN PATENT DOCUMENTS

| | | |
|---|---|---|
| EP | 0 955 739 | 11/1999 |
| JP | 5-153154 | 6/1993 |
| JP | 8-251182 | 9/1996 |

(Continued)

OTHER PUBLICATIONS

"Broadband Optical Access Systems Based On Passive Optical Networks (PON)", Proceedings of International Telecommunication Union, ITU-T Recommendation G.983.1, Oct. 1998, pp. 1-118.

(Continued)

*Primary Examiner*—Bob A. Phunkulh
(74) *Attorney, Agent, or Firm*—Oblon, Spivak, McClelland, Maier & Neustadt, P.C.

(57) ABSTRACT

In a communications system in which a plurality of subscriber apparatuses and a station apparatus are connected to the same transmission channel for bidirectional communication, a bandwidth allocated in a direction from subscriber apparatuses to a station apparatus is dynamically updated. More specifically, a bandwidth usage rate is calculated from a bandwidth allocated in a updating period and a bandwidth actually used in the updating period. A bandwidth to be allocated in a subsequent period is determined based on the bandwidth usage rate thus calculated. With this construction, the station apparatus is capable of allocating the bandwidth required by the subscriber apparatuses or subscriber terminal apparatuses so that the bandwidth is efficiently used.

16 Claims, 7 Drawing Sheets

U.S. PATENT DOCUMENTS

| | | | |
|---|---|---|---|
| 7,065,045 B2 * | 6/2006 | Jeffries et al. | 370/230 |
| 2003/0039211 A1 * | 2/2003 | Hvostov et al. | 370/230 |
| 2004/0202174 A1 * | 10/2004 | Kim et al. | 370/395.1 |

FOREIGN PATENT DOCUMENTS

| | | |
|---|---|---|
| JP | 9-200235 | 7/1997 |
| JP | 10-23055 | 1/1998 |
| JP | 11-150543 | 6/1999 |
| JP | 2000-13424 | 1/2000 |
| JP | 2000-508132 | 6/2000 |

OTHER PUBLICATIONS

T. Yokotani, et al., The Institute of Electronics, Information and Communication Engineers, vol. 100, No. 300, pp. 143-148,"Survey of Control Mechanisms for Dynamic Bandwidth Assignment on ATM-PON and Their Comparison", Sep. 22, 2000.

* cited by examiner

BANDWIDTH UPDATING METHOD AND BANDWIDTH UPDATING APPARATUS

BACKGROUND OF THE INVENTION

1. Field of the Invention

The present invention generally relates to bandwidth updating methods and bandwidth updating apparatuses and, more particularly, to a bandwidth updating method and a bandwidth updating apparatus for a communications system of time-division multiple access type in which a plurality of subscriber apparatuses are connected to a single transmission channel.

2. Description of the Related Art

One example of a communications system of a time-division multiple access type in which a plurality of subscriber apparatuses are connected to a single transmission channel is an Asynchronous Transfer Mode-Passive Optical Network (ATM-PON) system described in the ITU-T Recommendation G.983.1. FIG. 7 shows a construction of an ATM-PON system. Referring to FIG. 7, the system comprises a station apparatus 1 provided at a station, subscriber apparatuses 2-1–2-N provided at the subscribers' end and capable of bidirectional communication with the station apparatus 1, a transmission channel 3 shared by the station apparatus and the subscriber apparatuses 2-1–2-N, a transmission enable information generating function 11, a downstream signal generating function 12, a physical interface function 13, a upstream signal terminating function 14, and a bandwidth control function 15.

Downstream communication from the station apparatus 1 to the subscriber apparatuses 2-1–2-N is broadcast of the same data to the subscriber apparatuses 2-1–2-N. Each of the subscriber apparatus retrieves data destined for the retrieving apparatus from the received data. In upstream communication from the subscriber apparatuses 2-1–2-N to the station apparatus 1, the subscriber apparatuses 2-1–2-N are allowed to transmit upstream signals only in those time slots allocated by the station apparatus 1 to the transmitting apparatus. Transmission enable information designating the time slots in which the upstream signal transmission is enabled is generated by the transmission enable information generating function 11 and multiplexed by the downstream signal generating function 12. The size per unit time designated by the transmission enable information provided to the subscriber apparatus is based on a bandwidth allocated to the subscriber apparatus in accordance with a communications service agreement. The bandwidth control function calculates the size per unit time designated by the transmission enable information transmitted to the subscriber apparatuses 2-1–2-N and sets the size in the transmission enable information generating function 11, in accordance with the number of connections accommodated in the subscriber apparatuses 2-1–2-N and variation in capacity required in the connections.

In the bandwidth updating system according to the related art, the transmission enable information should be given to the subscriber apparatuses 2-1–2-N so as to ensure that the bandwidth adapted for a peak cell rate (PCR) is available even when a variable bit rate connection such as a VBR (variable bit rate) connection and a UBR (unspecified bit rate) connection is set up. Since a fixed bandwidth is allocated to each of a plurality of subscriber apparatuses, the bandwidth allocated to a unit subscriber is small. Another disadvantage is that, since the fixed bandwidth continues to be allocated even when the traffic is small with respect to the allocated bandwidth, the efficiency of bandwidth usage is relatively low.

SUMMARY OF THE INVENTION

Accordingly, a general object of the present invention is to provide a bandwidth updating method and a bandwidth updating apparatus in which the aforementioned disadvantages are eliminated.

Another and more specific object is to provide a bandwidth updating method and a bandwidth updating apparatus in which an upstream bandwidth is dynamically, instead of statically, allocated to a subscriber in accordance with the subscriber traffic, so that the bandwidth is efficiently used.

The aforementioned objects can be achieved by a dynamic bandwidth updating method for a communications system in which a plurality of subscriber apparatuses and a station apparatus are connected to the same transmission channel for bidirectional communication, for dynamically updating a bandwidth allocated in a direction of upstream transmission from the subscriber apparatuses to the station apparatus, comprising the steps of: calculating a bandwidth usage rate from a bandwidth allocated in a bandwidth updating period and a bandwidth actually used in the bandwidth updating period; and determining a bandwidth to be allocated in a subsequent bandwidth updating period based on the bandwidth usage rate.

The aforementioned objects can also be achieved by a bandwidth updating method for a communications system in which a plurality of subscriber apparatuses, each connected to respective subscriber terminal apparatuses, and a station apparatus are connected to the same transmission channel for bidirectional communication, for dynamically updating a bandwidth allocated in a direction of upstream transmission from the subscriber terminal apparatuses to the station apparatus via the subscriber apparatuses, comprising the steps of: calculating a bandwidth usage rate from a bandwidth allocated in a bandwidth updating period and a bandwidth actually used in the bandwidth updating period; and determining a bandwidth to be allocated in a subsequent bandwidth updating period based on the bandwidth usage rate.

According to these aspects of the invention, the station apparatus is capable of allocating a bandwidth required by the subscriber apparatus or the subscriber terminal apparatus so that the bandwidth is efficiently allocated.

The allocation of bandwidth may involve ensuring that a minimum guaranteed bandwidth guaranteeing a minimum level of communication is allocated to the subscriber apparatus, and determining a surplus bandwidth which is a result of subtraction of the minimum guaranteed bandwidth from an allocated bandwidth.

The allocation of bandwidth may involve ensuring that a minimum guaranteed bandwidth guaranteeing a minimum level of communication is allocated to the subscriber terminal apparatus, and determining a surplus bandwidth which is a result of subtraction of the minimum guaranteed bandwidth from an allocated bandwidth.

According to these aspects of the invention, communication is prevented from being disabled by successfully avoiding a zero-bandwidth status.

The bandwidth updating method may further comprise the steps of: calculating in the subscriber apparatus a requested surplus bandwidth requested of the station apparatus; and determining in the station apparatus the surplus bandwidth based on the requested surplus bandwidth, so as to determine the bandwidth to be allocated.

The bandwidth updating method may further comprise the steps of: calculating in the subscriber terminal apparatus a requested surplus bandwidth requested of the station apparatus; and determining in the station apparatus the surplus bandwidth based on the requested surplus bandwidth, so as to determine the bandwidth to be allocated.

According to these aspects of the invention, requests from the subscriber apparatuses or the subscriber terminal apparatuses are processed in an integrated manner in determining the bandwidth to be allocated.

The surplus bandwidth is calculated using a first upper threshold value for determination that there is a bandwidth shortage when an allocated bandwidth is equal to the minimum guaranteed bandwidth, a second upper threshold value for determination that there is a bandwidth shortage when the allocated bandwidth is larger than-the minimum guaranteed bandwidth and a lower threshold value for determination that there is an excessive bandwidth when the allocated bandwidth is larger than the minimum guaranteed bandwidth.

According to this aspect of the invention, the status of bandwidth usage is properly determined when the traffic through the subscriber apparatus or the subscriber terminal apparatus is below the minimum guaranteed bandwidth, preventing the bandwidth from being unnecessarily built up so that the bandwidth is efficiently used.

When it is determined, in a case in which the allocated bandwidth is equal to the minimum guaranteed bandwidth, that the bandwidth usage rate exceeds the first upper threshold value or when it is determined, in a case in which the allocated bandwidth is larger than the minimum guaranteed bandwidth, that the bandwidth usage rate exceeds the second threshold value, the surplus bandwidth may be calculated such that a maximum bandwidth set up for the subscriber apparatus is allocated to the subscriber apparatus in the subsequent bandwidth updating period.

When it is determined, in a case in which the allocated bandwidth is equal to the minimum guaranteed bandwidth, that the bandwidth usage rate exceeds the first upper threshold value or when it is determined, in a case in which the allocated bandwidth is larger than the minimum guaranteed bandwidth, that the bandwidth usage rate exceeds the second threshold value, the surplus bandwidth may be calculated such that a maximum bandwidth set up for the subscriber terminal apparatus is allocated to the subscriber terminal apparatus in the subsequent bandwidth updating period.

According to these aspects of the invention, bandwidth updating adapted for variation in traffic condition in the subscriber apparatus or the subscriber terminal apparatus is possible so that the possibilities of data delay are reduced.

When it is determined, in a case in which the allocated bandwidth is larger than the minimum guaranteed bandwidth, that the bandwidth usage rate exceeds the lower threshold value but does not exceed the second upper threshold value, the surplus bandwidth may be calculated such that a bandwidth currently allocated to the subscriber apparatus continues to be allocated to the subscriber apparatus in the subsequent bandwidth updating period.

When it is determined, in a case in which the allocated bandwidth is larger than the minimum guaranteed bandwidth, that the bandwidth usage rate exceeds the lower threshold value but does not exceed the second upper threshold value, the surplus bandwidth may be calculated such that a bandwidth currently allocated to the subscriber terminal apparatus continues to be allocated to the subscriber terminal apparatus in the subsequent bandwidth updating period.

According to these aspects of the invention, it is ensured that the bandwidth allocated in the subsequent bandwidth updating period does not exceed the second upper threshold value so that unnecessary bandwidth allocation is avoided and the bandwidth is efficiently used.

When it is determined, in a case in which the allocated bandwidth is larger than the minimum guaranteed bandwidth, that the bandwidth usage rate does not exceed the lower threshold value, the surplus bandwidth may be calculated such that the bandwidth, actually used in the bandwidth updating period for determination of the surplus bandwidth, is at a level in the middle of the second upper threshold value and the lower threshold value for the bandwidth allocated in the subsequent bandwidth updating period.

According to this aspect of the invention, it is ensured that the bandwidth allocated in the subsequent bandwidth updating period does not exceed the second upper threshold value so that unnecessary bandwidth allocation is avoided and the bandwidth is efficiently used.

The requested surplus bandwidth of a negative value may be rounded up to 0

According to this aspect of the invention, it is ensured that the minimum guaranteed bandwidth is allocated.

The surplus bandwidth may be calculated by weighting a dynamically allocatable bandwidth, a difference between a maximum bandwidth and the minimum guaranteed bandwidth, by the requested surplus bandwidth and a parameter that serves as a reference for a charge incurred.

According to this aspect of the invention, fair bandwidth allocation, which allows for both the requested surplus bandwidth and the parameter that serves as a reference for communications charge incurred, is possible.

A bandwidth allocated to the subscriber apparatus may not exceed a maximum bandwidth set up for the subscriber apparatus.

According to this aspect of the invention, allocation of an unnecessary bandwidth is avoided so that the bandwidth is allocated efficiently.

BRIEF DESCRIPTION OF THE DRAWINGS

Other objects and further features of the present invention will be apparent from the following detailed description when read in conjunction with the accompanying drawings, in which.

DETAILED DESCRIPTION OF THE PREFERRED EMBODIMENTS

Figure 1:
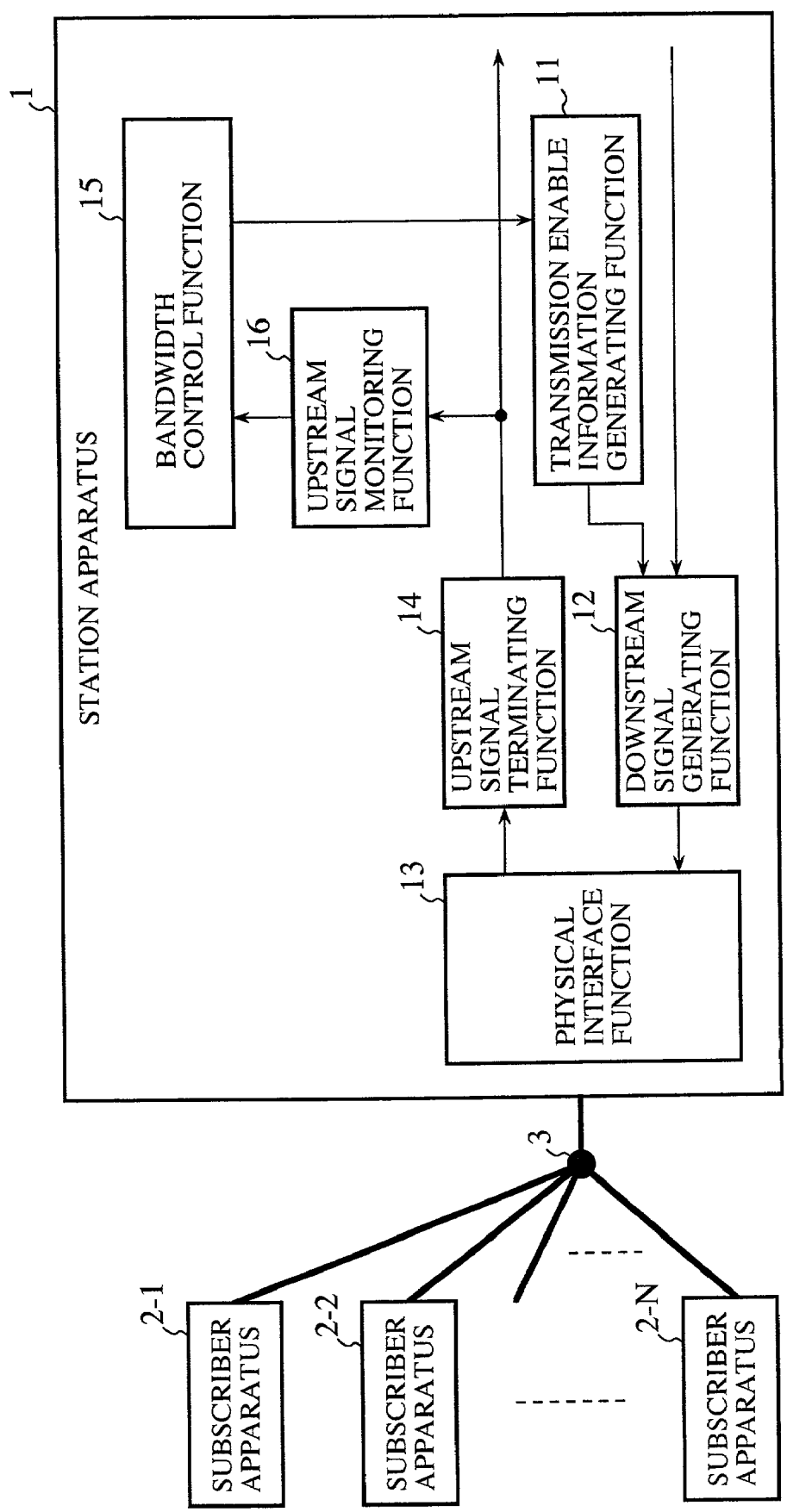
FIG. 1 is a block diagram showing a construction of a communications system according to an embodiment of the present invention.

FIG. 1 shows a construction of a communications system of time-division multiple access type according to an embodiment of the present invention. Referring to FIG. 1, the system comprises a station apparatus 1, subscriber apparatuses 2-1–2-N, and a transmission channel 3 shared by the station apparatus 1 and the subscriber apparatuses 2-1–2-N. Each of the subscriber apparatuses 2-1–2-N is connected to a subscriber terminal apparatus (not shown) such as a private branch exchange (PBX), a router and a personal computer. For each bandwidth updating period, a bandwidth control function 15 determines an upstream bandwidth allocated to the subscriber apparatuses 2-1–2-N and sets related information in a transmission enable information generating function 11. The transmission enable information generating function 11 generates transmission enable information based on the related information thus set therein. A downstream signal generating function 12 multiplexes downstream data and the transmission enable information. A physical interface function 13 transmits a downstream signal over the transmission channel. A physical interface function 13 also receives an upstream signal from the subscriber apparatuses 2-1–2-N and delivers the signal to an upstream signal terminating function 14. An upstream signal monitoring function 16 monitors the upstream signal and calculates the number of slots used by each of the subscriber apparatuses 2-1–2-N. The bandwidth control function 15 calculates a bandwidth usage rate based on the number of allocated upstream slots and the number of slots actually used and reported from the upstream signal monitoring function 15, so as to determine a bandwidth to be allocated for a subsequent bandwidth updating period.

A description will now be given of bandwidth updating implemented by the bandwidth control function 15. A minimum guaranteed bandwidth BW_min(i) and a maximum bandwidth BW_max(i) are determined for each subscriber terminal apparatus i(i=1,2, . . . M). The number M of subscriber terminal apparatuses and the number N of subscriber apparatuses need not be the same. That is, a single subscriber apparatus may accommodate a plurality of subscriber terminal apparatuses so that the bandwidth is individually updated for each of the subscriber terminal apparatuses. Alternatively, the bandwidth may be updated in unit of a connection group. For example, the minimum guaranteed bandwidth BW_min(i) may be a total of a peak cell rate (PCR) sum sum_CBR_PCR of constant bit rate (CBR) connections provided to the subscriber terminal apparatus i and a sustainable cell rate (SCR) sum sum_VBR_SCR of variable bit rate (VBR) connections provided to the subscriber terminal apparatus i. The maximum bandwidth BW_max(i) may be determined by the provisions regarding the charge incurred.

Figure 2:
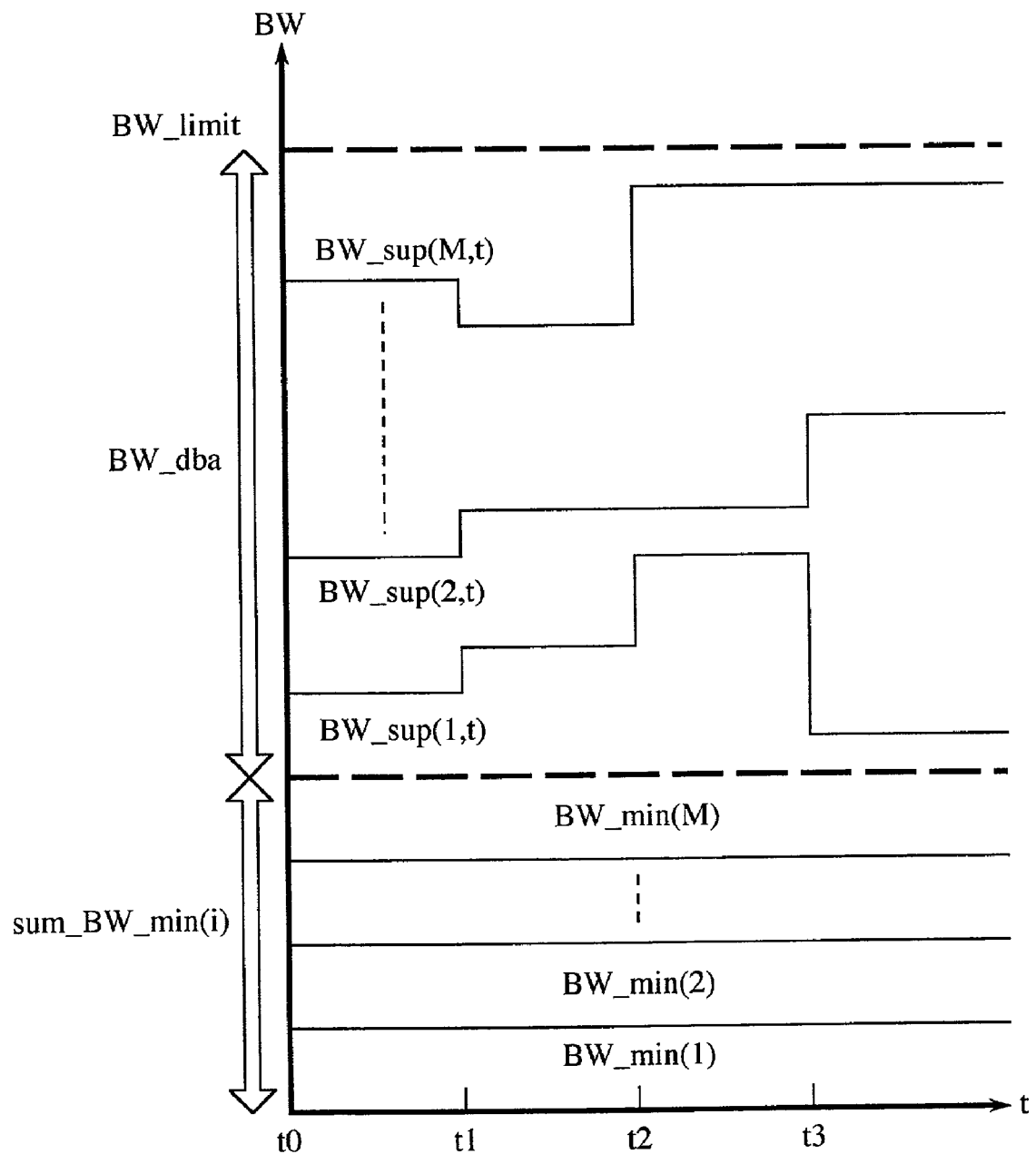
FIG. 2 is an illustration of a bandwidth updating operation according to the invention.

As shown in FIG. 2, given that a physical limit of bandwidth carried over a transmission channel is indicated by BW_limit and a sum of the minimum guaranteed bandwidth BW_min(i) for the entire subscriber terminal apparatuses is indicated by sum_BW_min, a dynamically allocatable bandwidth BW_dba is given by expression (1) below.

$$BW\_dba = BW\_limit - sum\_BW\_min \quad (1)$$

The minimum guaranteed bandwidth BW_min(i) is guaranteed to each of the subscriber terminal apparatuses irrespective of the traffic condition. The bandwidth BW(i,t) allocated to the subscriber terminal apparatus i at time t is determined by adding a surplus bandwidth BW_sup(i,t) to the minimum guaranteed bandwidth BW_min(i). Therefore, expression (2) below is satisfied.

$$BW(i,t) = BW\_min(i) + BW\_sup(i,t) \quad (2)$$

The surplus bandwidth BW sup(i,t) is determined by dividing the dynamically allocatable bandwidth BW_dba by the number of subscriber terminal apparatuses. Given the sum of the surplus bandwidth BW_sup(i,t) at time t for the entire subscriber terminal apparatuses is sum_BW_sup(t), the following expression (3) is satisfied.

$$BW\_dba \geq sum\_BW\_sup(t) \quad (3)$$

Figure 3:
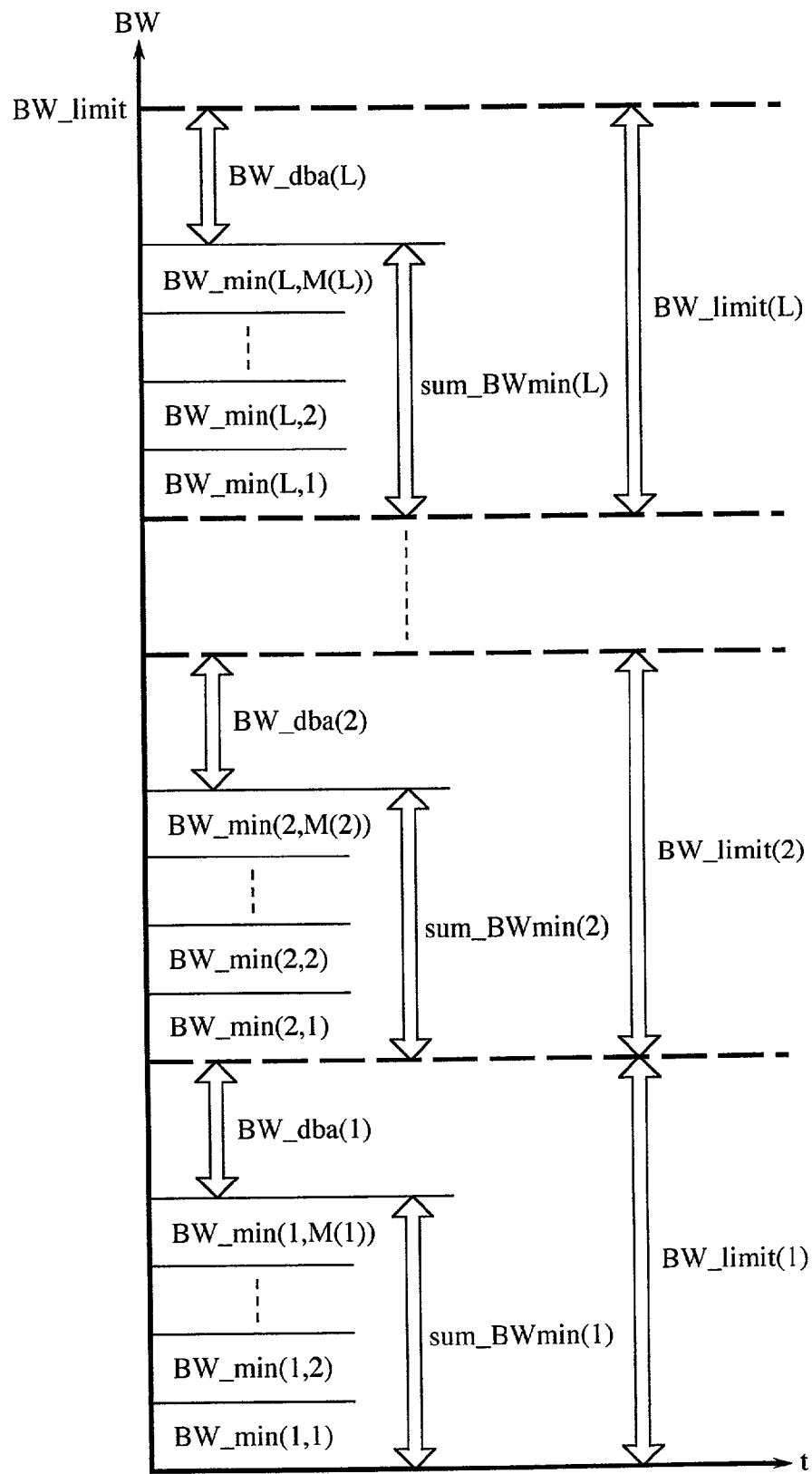
FIG. 3 is another illustration of a bandwidth updating operation according to the invention.

As shown in FIG. 3, the invention may be extended to a configuration in which the subscriber terminal apparatuses are divided into a total of L groups so that the bandwidth is shared within each of the groups. In this case, the maximum bandwidth for each group is fixed. Given that the maximum bandwidth allocated to group j(j=1,2, . . . L) is BW_limit(j) and a sum of the minimum guaranteed bandwidth BW_min (j,i) of the entire subscriber terminal apparatuses belonging to group j is indicated by sum_BW_min(j), a bandwidth BW_dba(j) that may be dynamically allocated in group j is given by expression (4) below.

$$BW\_dba(j) = BW\_limit(j) - sum\_BW\_min(j) \quad (4)$$

In order to determine whether the bandwidth allocated to each subscriber terminal apparatus is appropriate for the traffic condition, comparisons are made between the bandwidth usage rate and threshold values. More specifically, the bandwidth usage rate is compared with a first upper threshold value T_min used as a target of comparison when the bandwidth BW(i,t) allocated at time t to the subscriber terminal apparatus is equal to the minimum guaranteed bandwidth BW_min(i), a second upper threshold value T_up used when the bandwidth BW(i,t) allocated to the subscriber terminal apparatus at time t is larger than the minimum guaranteed bandwidth BW_min(i), and a third lower threshold value T_down used when the bandwidth allocated at time t to the subscriber terminal apparatus is larger than the minimum guaranteed bandwidth BW_min(i). For example, when the ATM communications system is used, the minimum guaranteed bandwidth is a total of a PCR sum sum_CBR_PCR of CBR connections provided to the subscriber terminal apparatus and a SCR sum sum_VBR_SCR of VBR connections provided to the subscriber terminal apparatus. Accordingly, T_min should be set to at least satisfy the following condition.

$$T\_min \geq (sum\_CBR\_PCR)/(sum\_CBR\_PCR + sum\_VBR\_SCR) \quad (5)$$

In a CBR connection, there is always a traffic at the PCR. For this reason, unless expression (5) is satisfied, a determination that there is a bandwidth shortage is yielded even when there is no traffic of a VBR connection. This results in a bandwidth larger than is necessary being provided to a subscriber terminal apparatus, preventing the other subscriber terminal apparatuses from being allocated a requested bandwidth. When the allocated bandwidth BW(i, t) is larger than BW_min(i), that is, when the traffic of a VBR connection is larger than that of SCR, the CBR connection occupies a relatively small portion of the bandwidth usage rate. In this case, T_up may be made smaller than T_min so that the capability of tracking variation in traffic may be improved.

Figure 4:
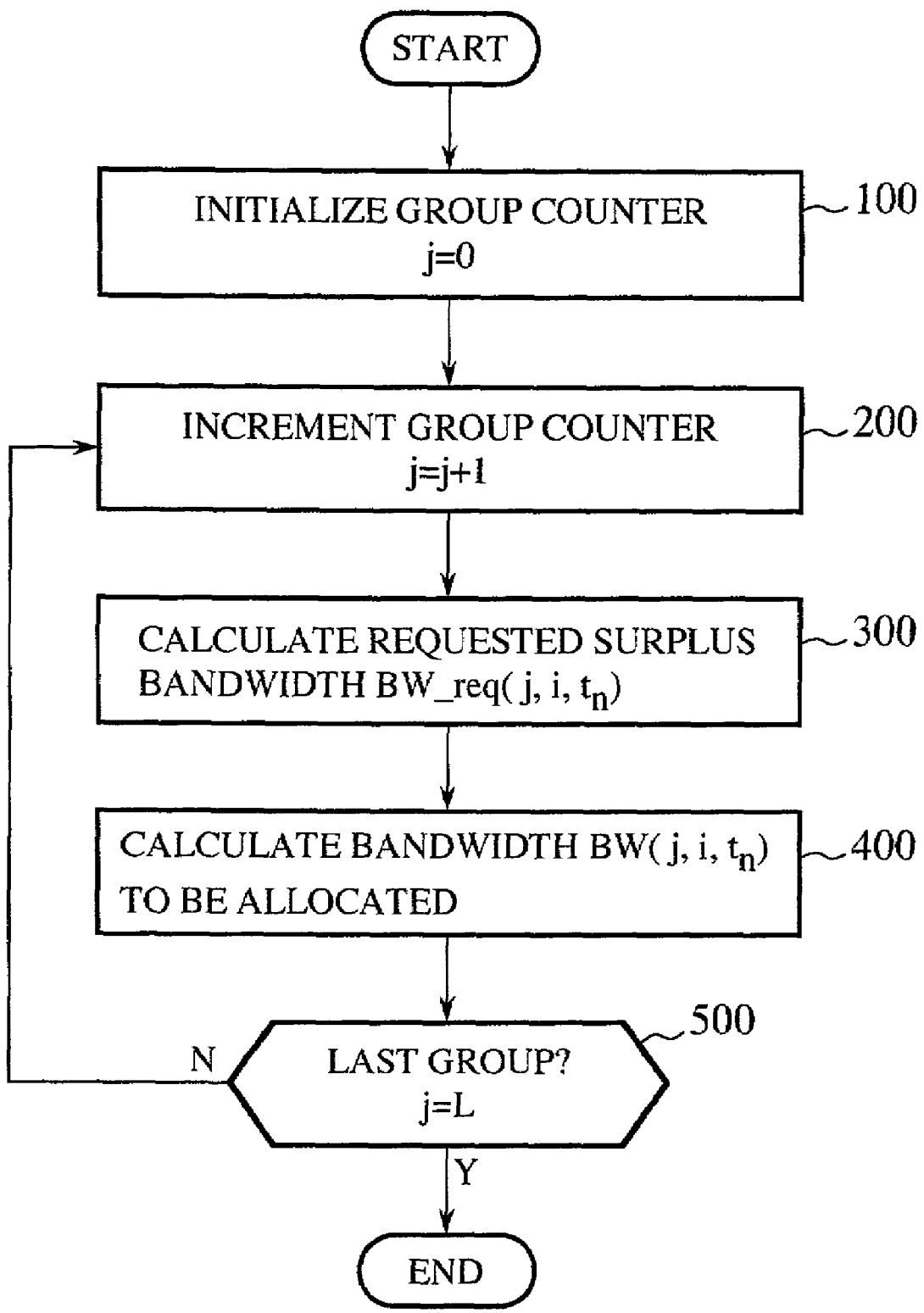
FIG. 4 is a flowchart illustrating an aspect of the operation according to the invention.

FIG. 4 is a flowchart schematically showing a bandwidth updating procedure executed by the bandwidth control function 15 for each bandwidth updating period. It is assumed that the subscriber terminal apparatuses are divided into a total of L groups, wherein group j(j=1,2, . . . L) accommodates a total of M(j) subscriber terminal apparatuses. In step 100, a group counter is initialized. In step 200, a group counter is incremented. In step 300 for calculation of a requested surplus bandwidth, a requested surplus bandwidth BW_req(j,i.t), requested by the subscriber terminal apparatus i accommodated in group j to be added to the minimum guaranteed bandwidth, is calculated. In step 400 for calculation of an bandwidth to be allocated, a comparison is made between a sum of the requested surplus bandwidth BW_req (j,i.t) requested by the entirety subscriber terminal apparatuses in each group and the dynamically allocatable bandwidth BW_dba(j), so as to calculate the bandwidth BW(j,i.t) to be allocated at time t. In step 500, a determination is made as to whether the calculation is complete for the entirety groups. If it is determined that there are any groups not yet processed, control is returned to step 200. If it is determined that the calculation is complete for the entirety groups, the bandwidth updating procedure is terminated.

In step 300 of FIG. 4 for calculation of the requested surplus bandwidth, the requested surplus bandwidth BW_req(j,i.t) for a subsequent bandwidth updating period is calculated for each of the subscriber terminal apparatuses, based on a relation between the bandwidth usage rate and the threshold value. Given that the bandwidth allocated to the subscriber terminal apparatus i at time $t_{n-1}$ is indicated by BW(j,i,tn-1) and the bandwidth used by the subscriber terminal apparatus i between period between time $t_{n-1}$ and time $t_n$ is indicated by BW_used(j,i,$t_n$), the bandwidth usage rate Urate(j,i,$t_n$) for a period between time $t_{n-1}$ and time $t_n$ satisfies the following equation.

$$\text{Urate}(j,i,t_n) = BW\_\text{used}(j,i,t_n)/BW(j,i,t_{n-1}) \quad (6)$$

where BW_used(j,i,$t_n$) indicates the number of slots used in a period between time $t_{n-1}$ and time $t_n$ determined by the upstream bandwidth monitoring function 15, and BW(j,i,$t_{n-1}$) indicates the number of slots allocated in a period between time $t_{n-1}$ and $t_n$.

When the bandwidth BW(j,i,$t_{n-1}$) allocated at time $t_{n-1}$ is equal to BW_min(j,i), the upper threshold T_min, used for comparison with the bandwidth usage rate when the minimum guaranteed bandwidth is initially used, is compared with the bandwidth usage rate Urate(j,i,$t_n$). When the bandwidth usage rate exceeds T_min, it indicates that the subscriber terminal apparatus started to receive input of burst traffic. The required magnitude of bandwidth is determined by examining the usage rate with respect to the allocated bandwidth. In a case in which the bandwidth usage rate exceeds T_min, the requested surplus bandwidth is determined such that the maximum bandwidth is available in the subsequent period. In this way, the bandwidth is efficiently updated so as to be adapted for the input of burst traffic. More specifically, the requested surplus bandwidth BW_13req (j,i.t$_n$) is calculated as per expression (7) below.

$$BW\_req(j,i,t_n) = BW\_\max(j,i) - BW\_\min(j,i) \quad (7)$$

When the bandwidth BW(j,i.$t_{n-1}$) allocated at time $t_{n-1}$ is larger than BW_min(j,i), the bandwidth usage rate is compared with the upper threshold value T_up and the lower threshold value T_down. When the bandwidth usage rate exceeds T_up, it indicates that the subscriber terminal apparatus started to receive input of burst traffic. Since the required magnitude of bandwidth is determined by comparing the usage rate with respect to the allocated bandwidth, the requested surplus bandwidth is determined such that that the maximum bandwidth is is available in the subsequent period. In this way, the bandwidth is efficiently updated so as to be adapted for the input of burst traffic. More specifically, the requested surplus bandwidth is calculated as per expression (7).

When the bandwidth usage rate does not exceed T_up but exceeds T_down, it is determined that the bandwidth required by the subscriber terminal apparatus matches the bandwidth allocated thereto. The requested surplus bandwidth for a subsequent bandwidth updating period is determined to be identical to the current bandwidth. More specifically, the requested surplus bandwidth is calculated as per expression (8) below.

$$BW\_req(j,i,t_n) = BW(j,i,t_{n-1}) - BW\_\min(j,i) \quad (8)$$

When the bandwidth usage rate is below T_down, it is determined that the allocated bandwidth is in excess of the bandwidth required by the subscriber terminal apparatus. The requested surplus bandwidth is determined such that the bandwidth BW_used(j,i.$t_n$) actually used is at a level in the middle of the upper threshold value T_up and the lower threshold value T_down for the bandwidth made available in the subsequent bandwidth updating period. Accordingly, the optimum bandwidth is allocated efficiently. More specifically, the requested surplus bandwidth BW_req(j,i.$t_n$) is calculated as per expression (9).

$$BW\_req(j,i,t_n) = BW\_\text{used}(j,i,t_n) \times 2/(T\_up + T\_\text{down}) - BW\_\min(j,i) \quad (9)$$

It is of course to be noted that the minimum guaranteed bandwidth is provided. Accordingly, when BW_req(j,i.$t_n$) <0, BW_req(j,i.$t_n$) is rounded up to 0.

In step 400 for calculation of the bandwidth to be allocated, a sum sum_BW_req(j,$t_n$) of the requested surplus bandwidth BW_req(j,i.$t_n$) of the entire subscriber terminal apparatuses belonging to group j is compared with the dynamically allocatable bandwidth BW_dba(j). If it is determined that sum_BW_req(j,tn) is below BW_dba(j), bandwidth allocation in compliance with requests from the subscriber terminal apparatuses is enabled. In this case, the surplus bandwidth BW_sup(j,i.$t_n$) added to the minimum guaranteed bandwidth is equal to the requested surplus bandwidth BW_req(j,i.$t_n$). If sum_BW_req(j,$t_n$) exceeds BW_dba(j), bandwidth allocation in compliance with requests from the subscriber terminal apparatuses is impossible. The dynamically allocatable bandwidth is allocated and the surplus bandwidth BW_sup(j,i.$t_n$) is calculated such that the dynamically allocatable bandwidth is weighted by the requested surplus bandwidth and a parameter Weight(i,j) that serves as a reference for the charge incurred by the subscriber terminal apparatus i. More specifically, given that a sum of products of the requested surplus bandwidth BW_req(j,i.$t_n$), which is not 0, of the subscriber terminal apparatuses belonging to group j, and the reference parameter Weight(j,i) is indicated by sum_BW_req_weight(j,$t_n$), the surplus bandwidth is calculated as per expression (10) below.

$$BW\_sup(j,i,t_n) = BW\_dba(j) \times \{BW\_req(j,i,t_n) \times \text{Weight}(j,i)\}/\text{sum}\_BW\_req_{13}\text{weight}(j,t_n) \quad (10)$$

By weighting the dynamically allocatable bandwidth by the requested surplus bandwidth and the parameter that serves as a reference for the charge incurred, allocation of bandwidth in excess of that actually required or allocation of bandwidth not consistent with the charge is avoided. Since the allocated bandwidth BW(j,i,t$_n$) should not exceed the maximum bandwidth BW_max(j,i), if the surplus bandwidth determined as per expression (10) satisfies $$BW\_sup(j,i,t_n) > BW\_max(j,i) BW\_min(j,i),$$

then the surplus bandwidth should be controlled so that $$BW\_sup(j,i,t_n) = BW\_max(j,i) - BW\_min(j,i) \qquad (11)$$

After calculating the surplus bandwidth BW_sup(j,i,t$_n$) of the subscriber terminal apparatus i, expression (2) is used to calculate the bandwidth BW(j,i,t$_n$) at time t.

Figure 5:
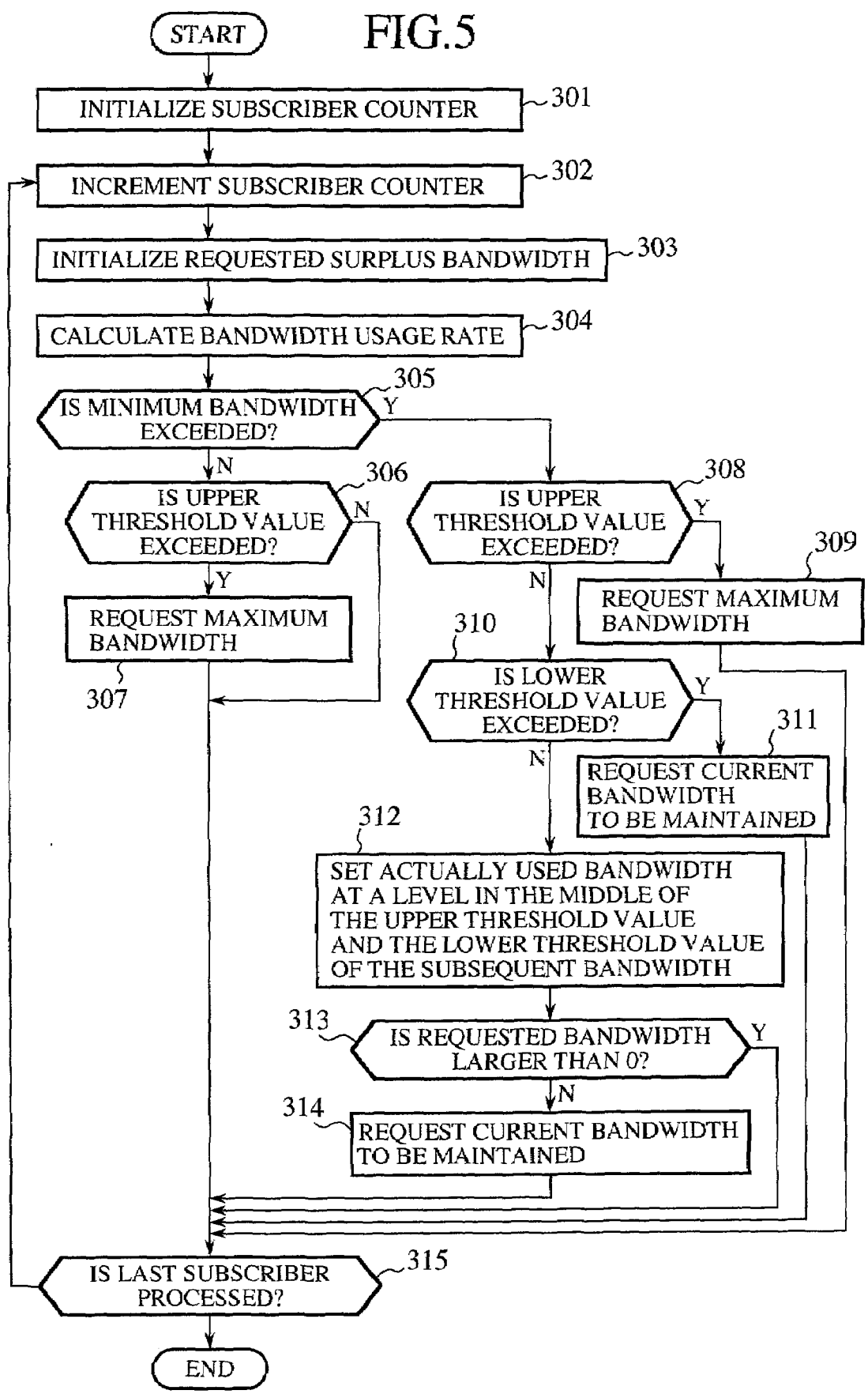
FIG. 5 is a flowchart illustrating another aspect of the operation according to the invention.

A detailed description of step 300 of FIG. 4 for calculating the requested surplus bandwidth will be given with reference to the flowchart of FIG. 5. In step 301, the subscriber counter is initialized. In step 302, the subscriber counter is incremented. In step 303, the requested surplus bandwidth BW_req(j,i,t$_n$) is initialized at 0. In step 304, the bandwidth usage rate Urate(j,i,t$_n$) is calculated in step 304 based on the number of slots BW(j,i,t$_{n-1}$) allocated at time t$_{n-1}$ and the number of used slots BW_used(j,i,t$_n$) determined by the upstream monitoring function 15.

In step 305, a determination is made as to whether the number of slots BW(j,i,t$_{n-1}$) allocated at time t$_{n-1}$ is larger than the number of minimum guaranteed slots BW_min(j,i). If an affirmative answer is yielded in step 305, control is turned to step 306, where the bandwidth usage rate is compared with the threshold value T_min used for comparison when the allocated bandwidth is equal to the minimum guaranteed bandwidth. If the bandwidth usage rate is larger than the minimum guaranteed bandwidth, it is determined that there is a shortage of bandwidth so that control is turned to step 307. In step 307, the requested surplus bandwidth is calculated so that the maximum bandwidth set up for the subscriber terminal apparatus is allocated thereto in the subsequent bandwidth updating period. If a negative answer is yielded in step 305, that is, if the allocated bandwidth is larger than the minimum guaranteed bandwidth, control is turned to step 308.

In step 308, a determination is made as to whether the bandwidth usage rate Urate(j,i,t$_n$) is larger than the upper threshold value T_up. If an affirmative answer is yielded it is determined that there is a bandwidth shortage so that control is turned to step 309, where the requested surplus bandwidth BW_req(j,i,t$_n$) is calculated as per expression (7). If a negative answer is yielded in step 308, control is turned to step 310, where a determination is made as to whether the bandwidth usage rate exceeds the lower threshold value T_down. If an affirmative answer is yielded in step 310, a determination is made that the allocated bandwidth balances the used bandwidth. The requested surplus bandwidth is calculated as per expression (8) so that the same bandwidth currently allocated to the subscriber terminal apparatus continues to be allocated thereto in the subsequent bandwidth updating period. If a negative answer is yielded in step 308, a determination is made that the excessive bandwidth is allocated so that control is turned to step 312.

In step 312, the requested surplus bandwidth is calculated as per expression (9) so that the actually used band width is at a level in the middle of the upper threshold value T_up and the lower threshold value T_down for the bandwidth made available in the subsequent bandwidth updating period. In step 313, a determination is made as to whether the bandwidth BW_req(j,i,t$_n$) requested by the subscriber terminal apparatus in the subsequent bandwidth updating period t$_n$ is larger than 0. If a negative answer is yielded in step 313, control is turned to step 314, where BW_req(j,i,t$_n$) is initialized to 0. If an affirmative answer is yielded in step 313, step 314 is skipped.

In step 315, a determination is made as to whether the calculation of bandwidth BW_req(j,i,t$_n$) to be added to the minimum guaranteed bandwidth is complete for the entire subscriber terminal apparatuses of group j. If the calculation is not complete for any subscriber terminal apparatuses, control is turned to step 302. When calculation is complete for the entire subscriber terminal apparatuses, the bandwidth updating procedure is terminated.

Figure 6:
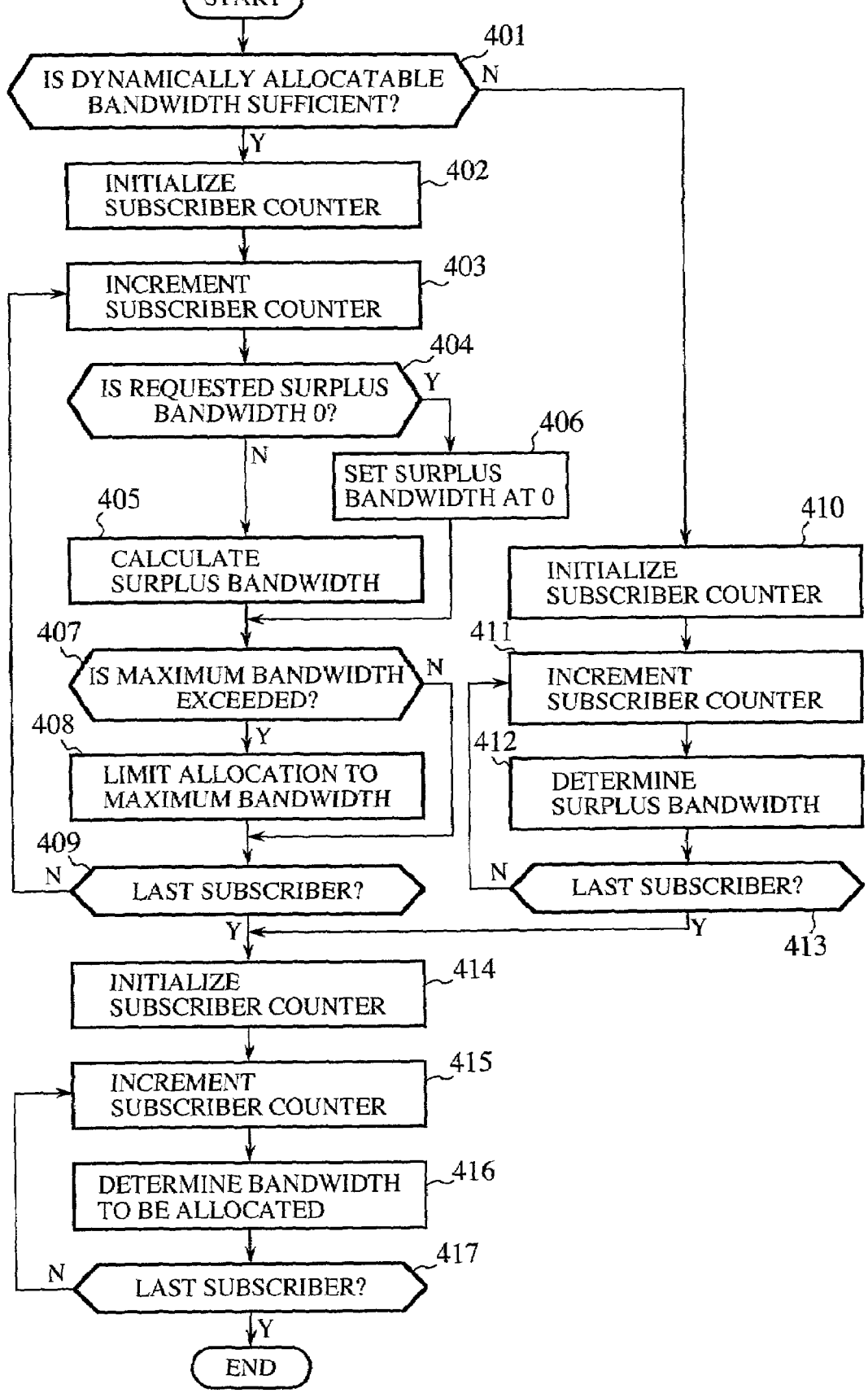
FIG. 6 is a flowchart illustrating still another aspect of the operation according to the invention.
Figure 7:
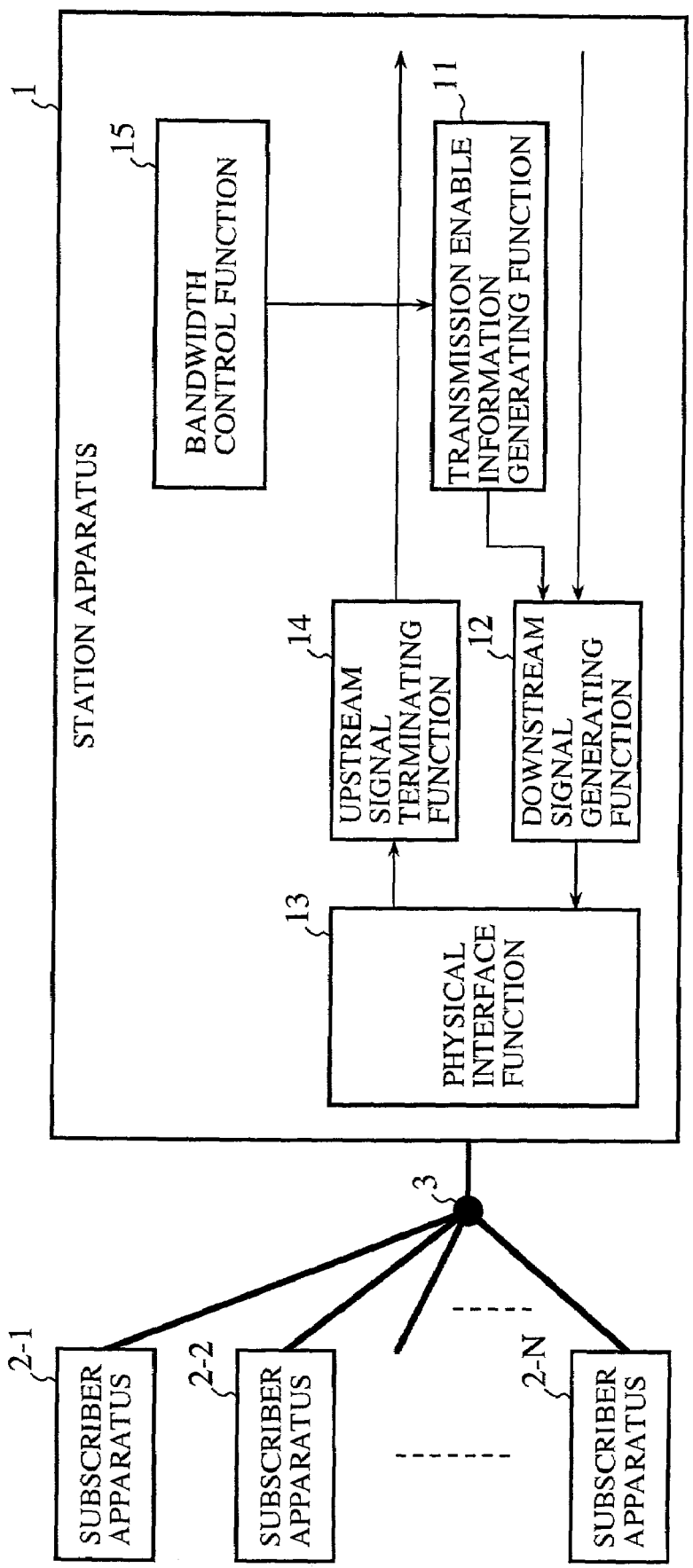
FIG. 7 is a block diagram showing a construction of a communications system according to the related art.

A detailed description will now be given of the calculation in step 400 of FIG. 4 of the bandwidth BW(j,i,t$_n$) allocated to the subscriber terminal apparatus at time t$_n$, with reference to the flowchart of FIG. 6. In step 401, a determination is made as to whether a sum of surplus time slots requested by the subscriber terminal apparatus exceeds the number of dynamically allocatable time slots. If an affirmative answer is yielded in step 401, control is turned to step 402.

In step 402, the subscriber counter is initialized. In step 403, the subscriber counter is incremented. In step 404, a determination is made as to whether the requested surplus bandwidth BW_req(j,i,t$_n$) is 0. If a negative answer is yielded, control is turned to step 405, where the dynamically allocatable bandwidth BW_dba(j) is divided between the subscriber terminal apparatuses requesting the surplus bandwidth, by weighting the dynamically allocatable bandwidth by the requested surplus bandwidth and the parameter Weight(j,i) (for example, the minimum guaranteed bandwidth) that serves as a reference for the charge incurred. If an affirmative answer is yielded in step 404, control is turned to step 406, where the surplus bandwidth BW_sup(j,i,t$_n$) is determined as 0.

In step 407, a determination is made as to whether a sum of the minimum guaranteed bandwidth BW_min(j,i) and the surplus bandwidth BW_sup(j,i,t$_n$) exceeds the maximum bandwidth BW_max(j,i). If an affirmative answer is yielded, control is turned to step 408, where the bandwidth to be allocated in the subsequent bandwidth updating period is determined as the maximum bandwidth. If a negative answer is yielded in step 407, step 408 is skipped. In step 409, a determination is made as to whether the calculation of the allocated bandwidth BW(j,i,t$_n$) is complete for the entire subscriber terminal apparatuses of group j. If the calculation is not complete for any subscriber terminal apparatuses, control is turned to step 403. If the calculation is complete for the entire subscriber terminal apparatuses, control is turned to step 404.

If a negative answer is yielded in step 401, control is turned to step 410, where the subscriber counter is initialized. In step 411, the subscriber counter is incremented. In step 412, the requested surplus bandwidth BW_req(j,i,t$_n$) is designated as the surplus bandwidth BW_sup(j,i,t$_n$). In step 413, a determination is made as to whether the calculation is complete for the entire subscriber terminal apparatuses of group j. When it is determined that the calculation is not complete for any of the subscriber terminal apparatuses, control is turned to step 411. When the calculation is complete for the entire subscriber terminal apparatuses, control is turned to step 414.

In step 414, the subscriber counter is initialized. In step 415, the subscriber counter is incremented. In step 416, as shown in expression (2), the bandwidth BW(j,i,t$_n$) to be allocated for the subsequent bandwidth updating period is determined as a sum of the minimum guaranteed bandwidth BW_min(j,i) and the surplus bandwidth BW_sup(j,i,t$_n$). In step 417, a determination is made as to whether the bandwidth to be allocated to the entire subscribers in group j has been calculated. When the calculation is not complete for any of the subscriber terminal apparatuses, control is returned to step 411. If the calculation is complete for the entire subscriber terminal apparatuses, the bandwidth updating procedure is terminated.

As has been described, the allocated time slots are updated in accordance with the status of usage by the subscriber terminal apparatuses of upstream time slots. Accordingly, the number of unused time slots is reduced so that the bandwidth is efficiently used.

The present invention is not limited to the above-described embodiments, and variations and modifications may be made without departing from the scope of the present invention.

What is claimed is:

1. A dynamic bandwidth updating method for a communications system in which a plurality of subscriber apparatuses and a station apparatus are connected to the same transmission channel for bidirectional communication, for dynamically updating a bandwidth allocated in a direction of upstream transmission from the subscriber apparatuses to the station apparatus, comprising the steps of:
   calculating a bandwidth usage rate from a bandwidth allocated in a bandwidth updating period and a bandwidth actually used in the bandwidth updating period; and
   determining a bandwidth to be allocated in a subsequent bandwidth updating period based on the bandwidth usage rate,
   wherein the allocation of bandwidth involves ensuring that a minimum guaranteed bandwidth guaranteeing a minimum level of communication is allocated to the subscriber apparatus, and determining a surplus bandwidth which is a result of subtraction of the minimum guaranteed bandwidth from an allocated bandwidth, and
   the surplus bandwidth is calculated using a first upper threshold value for determination that there is a bandwidth shortage when an allocated bandwidth is equal to the minimum guaranteed bandwidth, a second upper threshold value for determination that there is a bandwidth shortage when the allocated bandwidth is larger than the minimum guaranteed bandwidth and a lower threshold value for determination that there is an excessive bandwidth when the allocated bandwidth is larger than the minimum guaranteed bandwidth.

2. A bandwidth updating method for a communications system in which a plurality of subscriber apparatuses, each connected to respective subscriber terminal apparatuses, and a station apparatus are connected to the same transmission channel for bidirectional communication, for dynamically updating a bandwidth allocated in a direction of upstream transmission from the subscriber terminal apparatuses to the station apparatus via the subscriber apparatuses, comprising the steps of:
   calculating a bandwidth usage rate from a bandwidth allocated in a bandwidth updating period and a bandwidth actually used in the bandwidth updating period; and
   determining a bandwidth to be allocated in a subsequent bandwidth updating period based on the bandwidth usage rate,
   wherein the allocation of bandwidth involves ensuring that a minimum guaranteed bandwidth guaranteeing a minimum level of communication is allocated to the subscriber terminal apparatus, and determining a surplus bandwidth which is a result of subtraction of the minimum guaranteed bandwidth from an allocated bandwidth and
   the surplus bandwidth is calculated using a first upper threshold value for determination that there is a bandwidth shortage when an allocated bandwidth is equal to the minimum guaranteed bandwidth, a second upper threshold value for determination that there is a bandwidth shortage when the allocated bandwidth is larger than the minimum guaranteed bandwidth and a lower threshold value for determination that there is an excessive bandwidth when the allocated bandwidth is larger than the minimum guaranteed bandwidth.

3. The bandwidth updating method according to claim 2, further comprising the steps of:
   calculating in the subscriber terminal apparatus a requested surplus bandwidth requested of the station apparatus; and
   determining in the station apparatus the surplus bandwidth based on the requested surplus bandwidth, so as to determine the bandwidth to be allocated.

4. The bandwidth updating method according to claim 3, wherein the surplus bandwidth is calculated by weighting a dynamically allocatable bandwidth, a difference between a maximum bandwidth and the minimum guaranteed bandwidth, by the requested surplus bandwidth and a parameter that serves as a reference for a charge incurred.

5. The bandwidth updating method according to claim 2, wherein, when it is determined, in a case in which the allocated bandwidth is equal to the minimum guaranteed bandwidth, that the bandwidth usage rate exceeds the first upper threshold value or when it is determined, in a case in which the allocated bandwidth is larger than the minimum guaranteed bandwidth, that the bandwidth usage rate exceeds the second threshold value, the surplus bandwidth is calculated such that a maximum bandwidth set up for the subscriber terminal apparatus is allocated to the subscriber terminal apparatus in the subsequent bandwidth updating period.

6. The bandwidth updating method according to claim 2, wherein, when it is determined, in a case in which the allocated bandwidth is larger than the minimum guaranteed bandwidth, that the bandwidth usage rate exceeds the lower threshold value but does not exceed the second upper threshold value, the surplus bandwidth is calculated such that a bandwidth currently allocated to the subscriber terminal apparatus continues to be allocated to the subscriber terminal apparatus in the subsequent bandwidth updating period.

7. The bandwidth updating method according to claim 2, wherein, when it is determined, in a case in which the allocated bandwidth is larger than the minimum guaranteed bandwidth, that the bandwidth usage rate does not exceed the lower threshold value, the surplus bandwidth is calculated such that the bandwidth, actually used in the bandwidth updating period for determination of the surplus bandwidth, is at a level in the middle of the second upper threshold value and the lower threshold value for the bandwidth allocated in the subsequent bandwidth updating period.

8. The bandwidth updating method according to claim 2, wherein a bandwidth allocated to the subscriber terminal apparatus does not exceed a maximum bandwidth set up for the subscriber terminal apparatus.

9. The bandwidth updating method according to claim 1, further comprising the steps of:
   calculating in the subscriber apparatus a requested surplus bandwidth requested of the station apparatus; and determining in the station apparatus the surplus bandwidth based on the requested surplus bandwidth, so as to determine the bandwidth to be allocated.

10. The bandwidth updating method according to claim 9, wherein the surplus bandwidth is calculated by weighting a dynamically allocatable bandwidth, a difference between a maximum bandwidth and the minimum guaranteed bandwidth, by the requested surplus bandwidth and a parameter that serves as a reference for a charge incurred.

11. The bandwidth updating method according to claim 1, wherein, when it is determined, in a case in which the allocated bandwidth is equal to the minimum guaranteed bandwidth, that the bandwidth usage rate exceeds the first upper threshold value or when it is determined, in a case in which the allocated bandwidth is larger than the minimum guaranteed bandwidth, that the bandwidth usage rate exceeds the second threshold value, the surplus bandwidth is calculated such that a maximum bandwidth set up for the subscriber apparatus is allocated to the subscriber apparatus in the subsequent bandwidth updating period.

12. The bandwidth updating method according to claim 1, wherein, when it is determined, in a case in which the allocated bandwidth is larger than the minimum guaranteed bandwidth, that the bandwidth usage rate exceeds the lower threshold value but does not exceed the second upper threshold value, the surplus bandwidth is calculated such that a bandwidth currently allocated to the subscriber apparatus continues to be allocated to the subscriber apparatus in the subsequent bandwidth updating period.

13. The bandwidth updating method according to claim 1, wherein, when it is determined, in a case in which the allocated bandwidth is larger than the minimum guaranteed bandwidth, that the bandwidth usage rate does not exceed the lower threshold value, the surplus bandwidth is calculated such that the bandwidth, actually used in the bandwidth updating period for determination of the surplus bandwidth, is at a level in the middle of the second upper threshold value and the lower threshold value for the bandwidth allocated in the subsequent bandwidth updating period.

14. The bandwidth updating method according to claim 1, wherein a bandwidth allocated to the subscriber apparatus does not exceed a maximum bandwidth set up for the subscriber apparatus.

15. A dynamic bandwidth updating apparatus for a communications system in which a plurality of subscriber apparatuses and a station apparatus are connected to the same transmission channel for bidirectional communication, for dynamically updating a bandwidth allocated in a direction of upstream transmission from the subscriber apparatuses to the station apparatus, wherein
   a bandwidth usage rate is calculated from a bandwidth allocated in a bandwidth updating period and a bandwidth actually used in the bandwidth updating period, and
   a bandwidth to be allocated in a subsequent bandwidth updating period is determined based on the bandwidth usage rate,
   wherein the allocation of bandwidth involves ensuring that a minimum guaranteed bandwidth guaranteeing a minimum level of communication is allocated to the subscriber apparatus, and determining a surplus bandwidth which is a result of subtraction of the minimum guaranteed bandwidth from an allocated bandwidth, and
   the surplus bandwidth is calculated using a first upper threshold value for determination that there is a bandwidth shortage when an allocated bandwidth is equal to the minimum guaranteed bandwidth, a second upper threshold value for determination that there is a bandwidth shortage when the allocated bandwidth is larger than the minimum guaranteed bandwidth and a lower threshold value for determination that there is an excessive bandwidth when the allocated bandwidth is larger than the minimum guaranteed bandwidth.

16. A bandwidth updating apparatus for a communications system in which a plurality of subscriber apparatuses, each connected to respective subscriber terminal apparatuses, and a station apparatus are connected to the same transmission channel for bidirectional communication, for dynamically updating a bandwidth allocated in a direction of upstream transmission from the subscriber terminal apparatuses to the station apparatus via the subscriber apparatuses, wherein
   a bandwidth usage rate is calculated from a bandwidth allocated in a bandwidth updating period and
   a bandwidth actually used in the bandwidth updating period, and a bandwidth is determined to be allocated in a subsequent bandwidth updating period based on the bandwidth usage rate,
   wherein the allocation of bandwidth involves ensuring that a minimum guaranteed bandwidth guaranteeing a minimum level of communication is allocated to the subscriber terminal apparatus, and determining a surplus bandwidth which is a result of subtraction of the minimum guaranteed bandwidth from an allocated bandwidth, and
   the surplus bandwidth is calculated using a first upper threshold value for determination that there is a bandwidth shortage when an allocated bandwidth is equal to the minimum guaranteed bandwidth, a second upper threshold value for determination that there is a bandwidth shortage when the allocated bandwidth is larger than the minimum guaranteed bandwidth and a lower threshold value for determination that there is an excessive bandwidth when the allocated bandwidth is larger than the minimum guaranteed bandwidth.

* * * * *